(12) United States Patent
Sridhar et al.

(10) Patent No.: US 11,799,747 B2
(45) Date of Patent: Oct. 24, 2023

(54) SYSTEM AND METHOD FOR LINK BANDWIDTH MANAGEMENT

(71) Applicant: Sandvine Corporation, Waterloo (CA)

(72) Inventors: Kamakshi Sridhar, Plano, TX (US); Alexander Havang, Malmo (SE)

(*) Notice: Subject to any disclaimer, the term of this patent is extended or adjusted under 35 U.S.C. 154(b) by 155 days.

(21) Appl. No.: 17/234,990

(22) Filed: Apr. 20, 2021

(65) Prior Publication Data
US 2021/0328897 A1    Oct. 21, 2021

Related U.S. Application Data

(60) Provisional application No. 63/012,482, filed on Apr. 20, 2020.

(30) Foreign Application Priority Data

Apr. 15, 2021 (EP) .................... 21168565

(51) Int. Cl.
*H04L 43/0882* (2022.01)
*H04L 47/22* (2022.01)

(52) U.S. Cl.
CPC .......... *H04L 43/0882* (2013.01); *H04L 47/22* (2013.01)

(58) Field of Classification Search
CPC . H04L 43/0882; H04L 47/22; H04L 41/0896; H04L 43/0888; H04L 47/28
See application file for complete search history.

(56) References Cited

U.S. PATENT DOCUMENTS

| | | | |
|---|---|---|---|
| 10,771,393 B1* | 9/2020 | Korobov | H04L 67/133 |
| 2004/0001511 A1* | 1/2004 | Matta | H04L 43/00 370/468 |

(Continued)

FOREIGN PATENT DOCUMENTS

| | | |
|---|---|---|
| EP | 3172876 A1 | 5/2017 |
| EP | 3633936 A1 | 4/2020 |

OTHER PUBLICATIONS

S. Walsh, E. Garcia and S. Sezer, "Assessing the impact of rainfall on system bandwidth for broadband fixed wireless applications," Advanced Industrial Conference on Telecommunications (AICT/SAPIR/ELETE'05), 2005, pp. 279-283, doi: 10.1109/AICT.2005.31 (Year: 2005).*

(Continued)

*Primary Examiner* — Charles C Jiang
*Assistant Examiner* — Shawn D Miller
(74) *Attorney, Agent, or Firm* — Amarok IP Inc.; Neil W. Henderson

(57) ABSTRACT

A method for link bandwidth management in a computer network, the method including: monitoring link traffic flow for a predetermined amount of time; measuring throughput of the link traffic flow; estimating the bandwidth based on the throughput; and calibrating at least one shaper based on the estimated bandwidth. a system for link bandwidth management in a computer network, the system including: a learning module configured to monitor link traffic flow for a predetermined amount of time; an analysis module configured to measuring throughput of the link traffic flow and estimate the bandwidth based on the throughput; and a calibration module configured to calibrate at least one shaper based on the estimated bandwidth.

18 Claims, 3 Drawing Sheets

(56) References Cited

U.S. PATENT DOCUMENTS

| | | | | |
|---|---|---|---|---|
| 2005/0163059 A1* | 7/2005 | Dacosta | ............... | H04W 28/20 |
| | | | | 370/278 |
| 2010/0189063 A1 | 7/2010 | Kokku et al. | | |
| 2013/0003552 A1* | 1/2013 | Lott | ..................... | H04W 28/02 |
| | | | | 370/235 |
| 2020/0112483 A1* | 4/2020 | Sridhar | .............. | H04L 61/4511 |
| 2021/0006482 A1* | 1/2021 | Hwang | .................. | H04L 43/50 |

OTHER PUBLICATIONS

European Patent Office, European Search Report for Corresponding EP Pat. App No. 21168565.6, dated Sep. 24, 2021.

* cited by examiner

SYSTEM AND METHOD FOR LINK BANDWIDTH MANAGEMENT

RELATED APPLICATIONS

The present application claims priority to U.S. Provisional Patent Application No. 63/012,482 filed Apr. 20, 2020, which is hereby incorporated herein in its entirety.

FIELD

The present disclosure relates generally to management of computer network traffic. More particularly, the present disclosure relates to a system and method for link bandwidth management with a view to optimization.

BACKGROUND

Network traffic continues to increase all over the world. As network traffic increases, network providers and service providers try to manage their network to optimize the use of their network and maximize customer satisfaction and throughput of the network. Many networks are now incorporating fixed wireless networks as part of the network. Fixed wireless networks have become a viable solution for broadband network access. Fixed wireless services typically use a directional radio antenna designed for outdoor use.

As fixed wireless access becomes more reliable, more subscribers are requesting and network operators are offering this type of service. The overall increase in network traffic due to streaming video applications, high bandwidth gaming applications, and content downloads on increasingly bigger screen devices has led to traffic congestion issues on expensive and over-subscribed links. Operators need to manage the growing congestion within their telecom network while delivering sufficiently high Quality of Experience (QoE) to the end-subscriber. If not managed properly, the traffic growth could result in poor subscriber QoE for various applications, which then could lead to subscriber churn.

It is, therefore, desirable to provide an improved method and system for link bandwidth management with a view to optimization.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for link bandwidth management in a computer network, the method including: monitoring link traffic flow for a predetermined period; measuring throughput of the link traffic flow; estimating the bandwidth based on the throughput; and calibrating at least one shaper based on the estimated bandwidth.

In some cases, the method may further include: monitoring the link traffic flow after calibration; determining whether the calibration of the bandwidth is affecting traffic flow; and re-calibrating the at least one shaper based on the effect to the traffic flow.

In some cases, measuring the throughput of the link traffic flow may include: disabling the at least one shaper for a predetermined period at predetermined intervals; determining a highest throughput point at each predetermined interval; and estimating the bandwidth based on the highest throughput points.

In some cases, the predetermined period may be minutes and the predetermined intervals may be hours.

In some cases, estimating the bandwidth based on the highest throughput points may include determining a rolling averaged based on a predetermined number of previous highest throughput points.

In some cases, estimating the bandwidth based on the highest throughput points may include determining a weighted average favoring the more recent highest throughput points.

In some cases, determining whether the calibration of the bandwidth is affecting the traffic flow may include: determining whether packet loss changed after the calibration of the traffic flow.

In some cases, determining whether the calibration of the bandwidth is affecting the traffic flow may include: determining whether round trip time has changed after the calibration of the traffic flow.

In some cases, re-calibrating the at least one shaper may include: iteratively amending the shaper by increasing or decreasing allocation based on a shaper speed is being met.

In some cases, the bandwidth of the link traffic flow may be affected by atmospheric factors.

In another aspect, there is provided, a system for link bandwidth management in a computer network, the system including: a learning module configured to monitor link traffic flow for a predetermined amount of time; an analysis module configured to measuring throughput of the link traffic flow and estimate the bandwidth based on the throughput; and a calibration module configured to calibrate at least one shaper based on the estimated bandwidth.

In some cases, the system may further include: a monitoring module configured to monitor the link traffic flow after calibration and determine whether the calibration of the bandwidth is affecting traffic flow; and wherein the calibration module is further configured to re-calibrate the at least one shaper based on the effect to the traffic flow.

In some cases, the analysis module may be configured to measure the throughput of the link traffic flow by: disabling the at least one shaper for a predetermined period at predetermined intervals; determining a highest throughput point at each predetermined interval; and estimating the bandwidth based on the highest throughput points.

In some cases, the predetermined period may be minutes and the predetermined intervals may be hours.

In some cases, estimating the bandwidth based on the highest throughput points may include determining a rolling averaged based on a predetermined number of previous highest throughput points.

In some cases, estimating the bandwidth based on the highest throughput points may include determining a weighted average favoring the more recent highest throughput points.

In some cases, the monitoring module may be further configured to determine whether packet loss has changed after the calibration of the traffic flow.

In some cases, the monitoring module may be further configured to determine whether round trip time has changed after the calibration of the traffic flow.

In some cases, when re-calibrating the at least one shaper, the calibration module may be configured to: iteratively amend the shaper by increasing or decreasing allocations based on whether a shaper speed is being met.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a method and system for link bandwidth management, including estimation and optimization. In some cases, the system is configured to monitor the link over a period of time when there is no shaping or other traffic actions assigned to the link. After the initial set up time, the system may be configured to continue to monitor the traffic once the traffic is shaped or otherwise prioritized. In some cases, the system may include a designated period of time to remove the traffic actions in order to update the initial measurements. In other cases, the system may review network traffic measurements such as Round Trip Time (RTT) and Throughput to determine if the bandwidth is being fully used or if some bandwidth is being neglected or not optimized. Embodiments of the system and method are configured to determine the appropriate bandwidth and are intended to optimize the available link capacity via the appropriate bandwidth measurement. In some cases, the system and method may redefine the prioritization of the traffic based on the link estimation provided by the system.

Network operators are interested in managing network congestion in their network through automated mechanisms that detect the onset of congestion, and appropriately allocate bandwidth across the various classes of subscriber traffic. Classes of traffic may include, for example, video streaming traffic, gaming traffic, download traffic, and the like. This allocation of bandwidth is intended to be performed dynamically in order to provide adequate QoE because the traffic mix may vary depending on the time of the day, the subscriber mix, and other factors.

The bandwidth allocated to a traffic class at any instance may depend on the type of traffic flow (steady state or bursty traffic), relative percentage in comparison to others traffic types, the congestion level in the network, and the like. It is preferable that bandwidth allocation be done in an automated manner so that resource assignment of network devices can be responsive to various traffic fluctuations, which can occur suddenly. Sudden network traffic volume peaks and troughs are commonly referred to as bursty traffic. Internet traffic is bursty over a range of time scales, all the way from seconds to milliseconds. Bursty data traffic requires considerable network resources to deliver the bits in a timely manner. In contrast, some types of traffic, such as throughput of video streaming traffic, tend to be more steady state over time.

The application of any congestion management mechanism requires that the total available link bandwidth be an input into the congestion management mechanism. If the available bandwidth is known, then appropriate and effective congestion management techniques can be designed to decide how to allocate this pool of available bandwidth across various classes.

Figure 1:
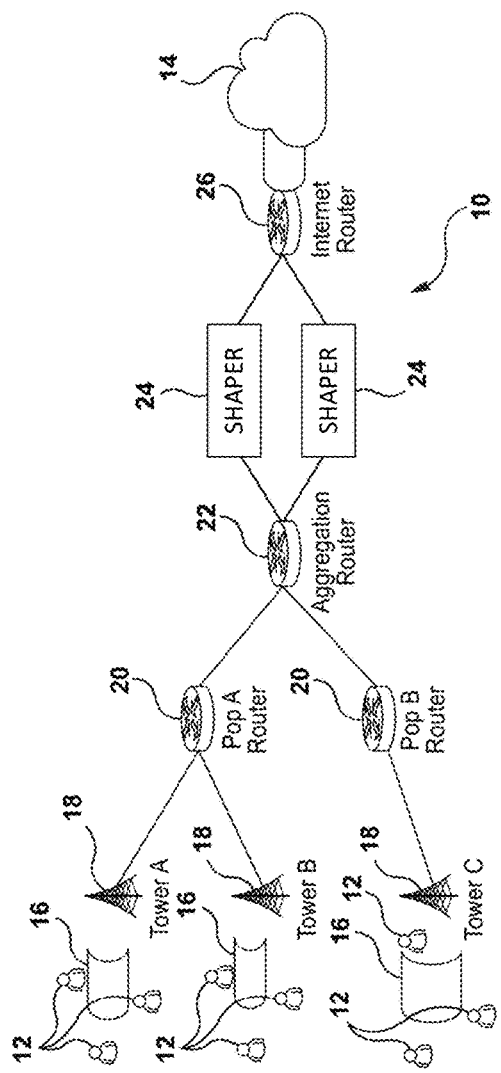
FIG. 1 illustrates an example computer network environment including fixed wireless access points.

For fixed access networks such as GPON or DSL, the available link bandwidth is generally known. Other access technologies such as LTE Fixed Wireless, 5G Fixed Wireless Access, satellite or microwave backhaul links may not have constant link bandwidths, which make the process of allocating bandwidth more difficult. FIG. 1 shows a diagram of an example network 10 with Fixed Wireless Access links and an inline shaper (called Active Logic). Subscribers 12 connect to the Internet 14 via a fixed wireless link 16. Each link 16 may be associated with a fixed wireless tower 18. The towers may transmit the network traffic to routers 20 which may further transmit the traffic to an aggregation router 22. The aggregation router may transmit the traffic through shapers 24 prior to the traffic being transmitted to an internet router 26 then to the destination via the Internet 14. It will be understood that the traffic travelling from the Internet to a subscriber would be transmitted in the opposite order to reach the subscriber 12.

Fixed Wireless Access networks generally have homes/subscribers receiving and transmitting signals from a fixed base-station. Fixed base-stations use similar principles of transmit and receive, for example, as a mobile base-station. However, since homes are stationary, the distance between the home and the base-station remains the same over time. This is not similar to a mobile network where users are moving around. However, even though in a fixed position, the signal between the base-station (cell tower) and the home still travels through air via radio propagation. As such, there may be variations in the signal strength (and thus, bandwidth) over time due to, for example, atmospheric conditions like temperature, humidity, foliage, external environment, and the like. This is true for every home exchanging signals from the base-station. Thus, the link bandwidth between the cell tower and the home is likely to be varying over time. Generally speaking, this variation will be at a reasonably slow rate.

Embodiments of the system and method detailed herein are intended to estimate the total available link bandwidth in the network, such as a LTE, 5G or any proprietary fixed wireless access network, without requiring any other inputs from any external sources. The system and method detailed herein may further be used in predicting other link bandwidth estimates, for example, DSL, Fiber to the Home, Fiber to the x (FTTX) or the like. The estimate of the total available link bandwidth may change dynamically in response to varying radio, backhaul conditions, for example, weather changes, season changes and the like. Once the link bandwidth of the network has been estimated, the bandwidth of the link may be managed with a view to being optimized.

Traditional methods for bandwidth allocation across classes of traffic, require that the total available bandwidth of the link be included as an input. For fixed access networks such as fiber, DSL, or the like, the link bandwidth may have less variation, and therefore may not benefit as much from the system and method detailed herein. However, these fixed access networks may still have some variation and may still benefit from a more accurate link bandwidth estimation. Embodiments herein are expected to have a bigger impact on Fixed Wireless Access solutions that serve users through LTE or 5G links to reach users, or for microwave backhaul links, where the available link capacity is not constant and may not even be known. It may vary depending on the spatial position of the active users relative to the base station, and/or to each other, it may vary depending on the radio conditions, and it may also vary depending on the contention level or for other factors.

Embodiments of the system and method detailed herein are intended to provide for a non-intrusive method to estimate link bandwidth in a varying channel without requiring external inputs. The system is configured to have access to determine and review the network traffic going through the link. The system and method are configured to monitor, measure, estimate, and calibrate the link bandwidth and appropriately modify the estimate of the link bandwidth as the bandwidth varies. Hence the system and method are intended to be continuously self-learning in that the system and method are able to improve the assessment of the link bandwidth estimate and are intended to optimize the bandwidth usage via the link bandwidth estimate.

Conventional solutions have required inputs such as Frame Utilization values from the base-station (eNodeB (eNB)) in order to determine if the link is congested. The interpretation of the Frame Utilization values depends on the specific eNB sending the information and therefore are often required to be calibrated accordingly. Moreover, the frequency of receiving the Frame Utilization value from the eNB may directly impact the ability to estimate the link bandwidth accurately.

Embodiments of the system and method detailed herein generally do not require the links to be congested for a significant duration of time prior to the link bandwidth estimation and management, although congestion may still occur for a short period of time.

Figure 2:
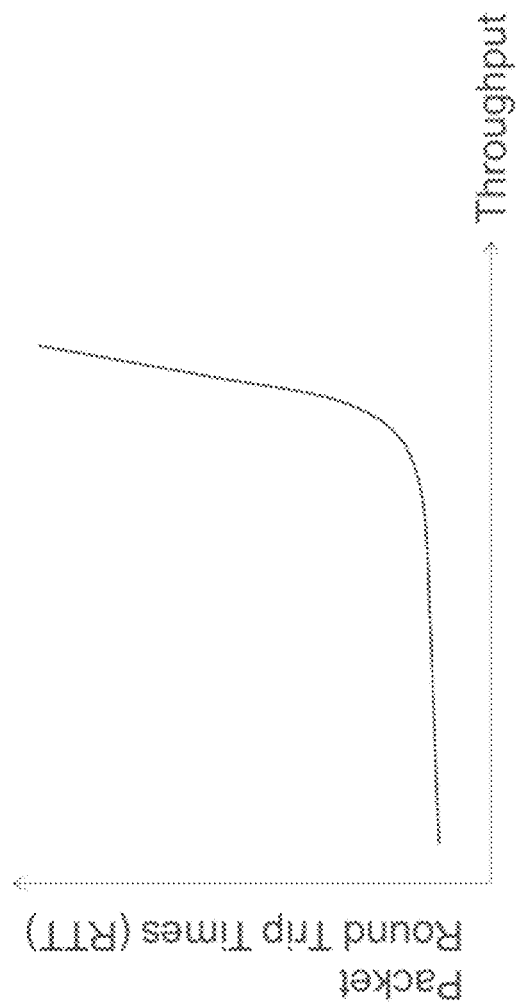
FIG. 2 illustrates a graph showing packet round trip time in comparison to throughput.

Another conventional approach considers using the knee of the round-trip-time (RTT) versus throughput graph in order to decide what the link bandwidth should be. FIG. 2 shows how an ideal curve of how the round-trip time of packets varies with varying link utilization. When the link utilization is low the round-trip-time is low. When the link utilization increases, the round-trip-time gradually increases. At some point as the input buffers fill up, the round-trip time increases sharply even with a small increase in link utilization. This transition point is sometimes referred to as the "knee". Beyond that, increasing the link utilization even in small amounts results in significant increase in round-trip-time. The knee of the round-trip-time vs link utilization curve varies typically between 40% to 70% depending on the type of traffic being carried on the link. For high bursty traffic, the knee may be at the lower end of the range, whereas for Poisson traffic, the knee may be at the upper end of the range. The drawback with this approach is that the ideal 'smooth' curve shown in FIG. 2 is not seen unless the traffic is highly filtered. Furthermore the knee of the curve may vary significantly depending on the type of the traffic. So using the knee of the curve to estimate the link bandwidth is not considered to be overly accurate. Furthermore, external factors can influence the RTT, for example, poor router placement in the home could increase the RTT well before the link capacity is reached.

Figure 3:
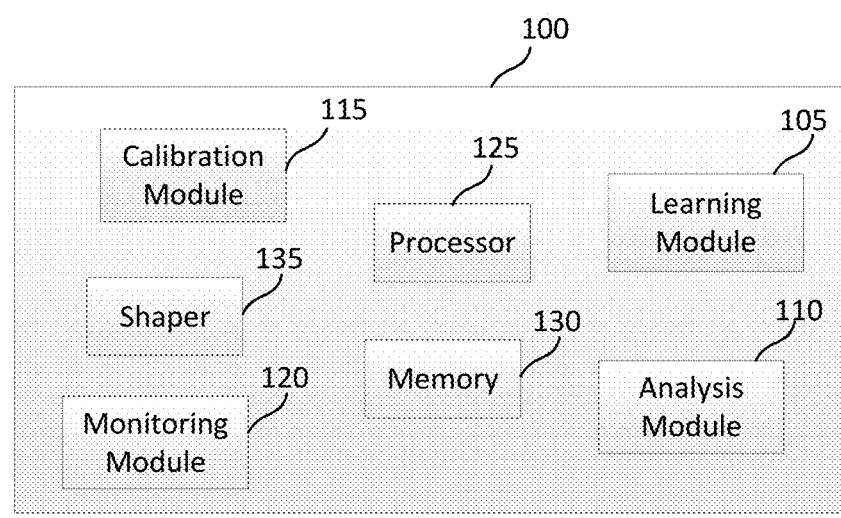
FIG. 3 illustrates a system for bandwidth link management according to an embodiment.

FIG. 3 illustrates a system 100 for bandwidth management according to an embodiment. The system includes a learning module 105, an analysis module 110, a calibration module 115, a monitoring module 120, a processor 125 and at least one memory component 130. In some cases, the system may include at least one shaper 135. In other cases, the system may be operatively connected to at least one shaper configured to prioritize the network traffic. The system 100 is intended to reside on the core network but may be remote or access remote resources, while having a connection to the core network. The modules, including the processor 125 and memory 130, are in communication with each other but may be distributed over various network devices or may be housed within a single network device. The processor 125 may be configured to carry out instructions (computer code or programs) stored in the memory 130. Instructions stored in the memory 130 are intended to provide for the functionality of the modules as detailed herein. The system 100 is intended to review the traffic flow from the network to allow the system 100 to determine traffic flow criteria, for example, round trip time, throughput, packet loss, and the like.

The learning module 105 is configured to review the traffic of the fixed wireless access link for an initial set up period. It is intended that the learning module 105 may review the traffic via open loop measurements, for example, without a shaper managing the traffic flow. The learning module 105 may be configured to further review the traffic for a predetermined amount of time during a cycle, for example, for an hour each day or the like. In some cases, the review may be when the traffic is not being shaped. The learning module 105 may attempt to capture instances of high throughput over the link being monitored.

The analysis module 110 is configured to review the data from the learning module and determine link capacity based on the measured data, as detailed herein. The analysis module 110 may further provide for an estimate of the bandwidth of the link.

The calibration module 115 is configured to use the estimate of the bandwidth from the analysis module 110 in order to calibrate at least one shaper 135 to prioritize the traffic. As the bandwidth estimate is intended to be an accurate estimate of the fixed wireless access link within a current period of time, it is intended that the at least one shaper 135 will make use of the available bandwidth without leaving bandwidth unaccounted for, which may lower throughput of the network. With the calibrating of the at least one shaper 135 more frequently based on updated bandwidth estimation, the prioritizing of the traffic is intended to make use of as much of the bandwidth as possible without the link becoming overly congested.

The monitoring module 120 is configured to monitor the traffic flow after an initial or subsequent calibration has been completed. In some cases, the monitoring module 120 is configured to monitor, for example, RTT and packet drops to determine whether the amended calibration of the bandwidth is positively or negatively affecting traffic flow. The monitoring module 120 may also determine when a further calibration may be desirable. The calibration process is intended to be a continuous and iterative process. Having the process continuous is intended to provide for calibration over time. This may be beneficial to Fixed Wireless Access networks where various factors, such as, for example, atmospheric conditions (for example temperature, humidity and the like), foliage, and other factors or characteristics, may cause the signal strengths (and thus, bandwidth) to vary over time.

Figure 4:
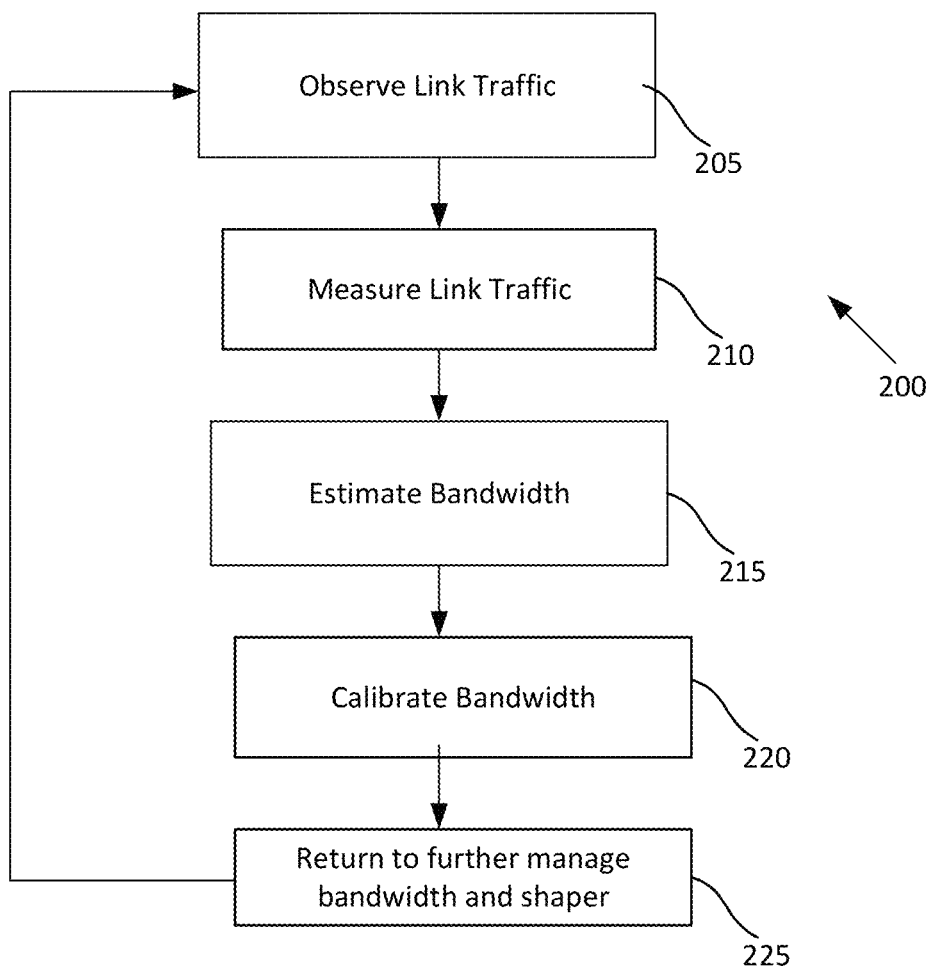
FIG. 4 illustrates a method for bandwidth link management according to an embodiment.

FIG. 4 illustrates a method 200 for bandwidth management according to an embodiment. At 205, the learning module 105, is configured to monitor the link traffic to provide network traffic flow data to the analysis module 110. It is intended that the network traffic flow may be initially on an open loop, i.e. without being prioritized by a shaper or the like. At 210, the link traffic is reviewed by the learning module 105 to measure capacity and estimate traffic conditions and congestion. The learning module 105 may operate either for a predetermined time or continuously and may operate on an open loop or on a closed loop. It will be understood that the learning module 105 may also review closed loop traffic during closed loop times either or both prior to and after the open loop.

At 215, the analysis module 110 is configured to estimate the bandwidth. At 220, the calibration module 120 is configured to calibrate the bandwidth with the estimated bandwidth from the analysis module in order to prioritize the traffic via the at least one shaper 135 for the available bandwidth. At 225, the method may return to further monitor and determine the network traffic behavior after the at least one shaper 135 has prioritized the traffic to determine if further modification would be appropriate by the at least one shaper 135. The method may return to observe link traffic at 205 or to another element of the method as appropriate. In some cases, it may not be necessary to run the leaning module again or only run the learning module periodically while running the analysis module more frequently. It will be understood that, generally speaking, the method or portions thereof, may run continuously or periodically and elements of the method may be performed simultaneously as detailed herein.

It will be understood that many of the aspects of embodiments of the system and method are intended to work in conjunction with each other. In a particular example, if there is no access to either packet Round-Trip-Time (RTT) estimates or packet drops across various classes, the open loop measurements may be used together with periodic closed loop measurements with periodic opening of the loop for a predetermined amount of time. Further the open loop measurements may be used together with continuous closed loop estimates with continuous closed loop calibration when there is access to either packet Round-Trip-Time (RTT) estimates or packet drops across various classes.

In a further specific example, the system may begin with an initialization phase, for example, open loop measurements of the network traffic with no shaper for a predetermined period of time, for example, 12 hours, 1 day, 2 days, 3 days or the like. Before any shaper is activated, the aim is to capture the one or more instances of the link with the highest throughput sent over the link. This is intended to be a reflection of the link capacity being able to support the bandwidth requested. In some specific cases, the memory component may store a table with the open loop estimates over time, which may be accessible to the modules of the system for reading and writing.

The link bandwidth estimation may then be done in conjunction with any closed loop shaper prioritization. In a shaping method, the method decides the bandwidth allocation across one or more classes or application types of traffic. Methods for shaping and prioritizing traffic are known and an appropriate shaping method may be selected. The system and method disclosed herein are intended to be compatible with various shaping methods.

After initialization, the shaper operation (sometimes referred to as closed loop operation) may be used while periodically opening the loop for one or more predetermined short durations, for example every hour or the like. The predetermined short duration may be a period of 30 seconds, 1 minute, 3, minutes, 5 minutes, or the like. As noted, the shaper may be periodically disabled for the short duration of time. This is intended to allow the learning module to sample the link periodically for measurements of the link bandwidth, without being influenced by the shaping being performed on the link.

The short period of open loop measurements may be done periodically, followed by periods of closed loop shaping. During the short period of open loop measurements, the highest bandwidth is intended to be measured. The measurements may be stored in a table containing the periodic, short open loop estimates over time. A sliding window may be implemented so that the older estimates are forgotten, or given a lower weight than newer estimates. The system is configured to determine the highest value within the current sliding window to determine the estimated link bandwidth. The duration of the sliding window is intended to be a reasonably small number, such as in the range of 5 to 20 or the like, over which the bandwidth estimates are evaluated. The choice of the range (duration of the sliding window) is a tradeoff between the need to consider recent values in the bandwidth estimates while keeping sufficient history of the bandwidth estimates in deciding the link bandwidth. The duration of the sliding window is intended to be configurable.

In some embodiments, the system and method may also include continuous closed loop bandwidth estimation with continuous closed loop calibration. In some cases, the results from the highest bandwidth measurements may be used as inputs for dynamic estimation of the link bandwidth through guessing and narrowing down.

Once an estimate of the link bandwidth throughput is found, then measurement of the link bandwidth when using a closed loop can be performed. This process allows for a more dynamic estimation of the link capacity, without being constrained by having to open the loop periodically, even if for a short duration. It is intended that the estimate is initially used as the shaper limit for the link bandwidth. The system, via, for example, the monitoring module, may examine the packet drops by the shaper and based on the number of packet drops provide instruction for the analysis module to raise or lower the link bandwidth estimate and the calibration module to recalibrate the shaper. Through iterative, binary searching, such as an Additive Increase Multiplicative Decrease (AIMD) as described herein, it is expected that the link bandwidth will converge to an appropriate value.

Advantages of the system and method over some of the conventional methods described above include that the system and method do not need any external inputs or information. The method is intended to adapt by learning and fine-tuning the estimate of the link bandwidth and therefore can accommodate changes in link capacity. Further embodiments of the system and method detailed herein are intended to be agnostic to the access technology and are intended to adapt quickly to changes in capacity.

Embodiments of the system and method detailed herein are intended to measure and estimate the link bandwidth based on the traffic flowing through the link. In a detailed example disclosed herein, it will be understood that the operations may be used in tandem, one after another in order to fine-tune the determined or optimal link bandwidth estimate.

It will be understood that the learning module may observe the link traffic for an initial period that is intended to provide initial data in which to estimate the link bandwidth. It is intended that link bandwidth estimation is performed in an open loop mode without the shaper enabled. Any active shapers may be disabled to get a sense of what the highest bandwidth estimate may be. Samples of the link bandwidth may be taken periodically by estimating the measured throughput during a short interval.

In a specific example measurements may be taken:

Every interval_gap intervals (for example: 4 min, 5 min, or the like)

All shapers are disabled and the loop is opened for one interval (in this example: 4 min)

The open loop interval is divided into subintervals of peak_period_ms. At the end of the open loop interval (in this example: 4 min), the system may examine the subintervals (for example, every ½ second, every second, every 2 seconds or the like) and look at the peak bandwidth seen in any subinterval.

With 1 s samples, there may be even further subintervals over which it is possible to measure the bits sent. In some cases, the lowest time interval over which bits are sent may be 250 ms. The peak bandwidth is the sum of the bits sent over the 4 sub-intervals of 250 ms each. The total bits sent over the 4 sub-intervals of 250 ms divided by 1 second will be the average bandwidth of the entire link.

The average bandwidth for the entire link is calculated for each subinterval and the maximum average bandwidth may be taken as a sample. For example, in a time interval of 4 minutes, there are 240 samples of 1 second each. The system is configured to calculate the average throughput sent over each of the 1 second intervals. The system may then determine the maximum value of the 240 samples. This is intended to reflect the link capacity.

The first calibration_period_bw_samples samples (in this example: 13 samples) may be used for the calibration. After calibration_period_bw_samples have been taken, the maximum of all of these samples may be determined by the calibration module as the calibrated link bandwidth, and saved as a baseline bandwidth for the given link.

After the initialization of the calibrated bandwidth estimate, closed loop shaper operation can occur with calibrated bandwidth. The most recent traceback_intervals link bandwidth samples may be stored in the memory component, where traceback_intervals is a configurable number. The traceback_intervals is intended to represent the size of the sliding window and may include a plurality of samples, for example 5 samples, 10 samples, 20 samples, 50 samples or the like. The maximum of the samples is chosen as the current link bandwidth. However, if this value is not within fluctuation_bound_percentage percent of the calibrated bandwidth, the value is adjusted. The fluctuation_bound_perscentage is intended to be used to provide a boundary in the amount of fluctuation provided in the bandwidth estimation.

The system is configured to periodically take throughput measurements, for example, at a predetermined interval. It is intended that this predetermined interval may be configured by an operator or may be predetermined by the system. The interval may be, for example, 1 hour, 2 hours, 4 hours, 8 hours or the like. For a short interval of time (for example, 4 minutes), the system may measure the bits over a duration of, for example, Tms to compute the average throughput.

In a specific example, the initialization period may be between 10 AM-2300 PM. With measurements taken once every hour. In this example, there are 13 samples (calibration_period_bw_samples) of throughput that would be available. The maximum of the 13 samples (highest sample) is recorded as the estimated value, and the most recent 10 samples (traceback_intervals) are stored by the system. Only those subsequent samples are stored that are within a predetermined range, for example, 10% of the maximum recorded during the initialization period or window.

For example, at 10 AM—the system measures a bandwidth of 100 Mbps. Thereon if all estimates are below 100 Mbps, and the next highest value is 60 Mbps (in the sliding window of 13 samples). The initial estimated bandwidth value will be 100 Mbps (even though it is outside the sliding window).

Now, after the system passes the initialization period or window the system may determine the next measurement of bandwidth to be 70 Mbps. Since this measurement is less than 100-10%=90 Mbps, use 100 Mbps, wherein the 10% may be configured as the fluctuation_bound_percentage. Alternatively, in the next iteration if the system measure the bandwidth of 95 Mbps—then the bandwidth estimation is changed to 95 Mbps.

In parallel, or alternatively, the system may also determine a dynamic link bandwidth estimation in closed loop operation. In some cases, the system may select this method when there is additional access to packet round-trip-time (RTT) or packet drops across various classes. In some cases, this method may be used instead of having any open loop measurements after the initialization period. Dynamic link bandwidth estimation is intended to allow the link bandwidth to be estimated in a real-time adaptive way when there is a shaper in place.

After initialization, the system may have determined a reasonable estimate of the ranges of link bandwidth for that link. Further monitoring, allows the link bandwidth estimate to be dynamically learnt in a more fine-tuned manner coexisting with and without interrupting any other shaper operation. The fine-tuning of bandwidth estimates allows the most accurate view of the current link bandwidth estimates to be known. This link bandwidth estimate can then be used as inputs for subsequent actions such as closed loop shaping.

In a particular example with the system and calibration module interacting with at least one shaper, at T0: Set shaper to initial link speed value (which is intended to be the MAX of theoretical max or the outcome of the initialization of the system after regular operation has been in place for some reasonable duration of time, for example, 2 days, 3 days, 5 days or the like. At T1: If shaper speed was met since T0, increase shaper (which would be an increase in link bandwidth estimate) by a predetermined increase, for example 2%, 5%, 10% or the like.

If shaper speed was not met, decrease shaper (which would be a decrease in the link bandwidth estimate) by a predetermined decrease, for example, 2%, 5%, 10% or the like.

It is intended that the system may determine whether the shaper speed is met or not by determining the packets in shaper queue induced latency greater than a time period X, such that a simple burst from the internet can be swallowed, possibly 1 seconds worth (or 500 ms) of queue or so. It will be understood that the latency time period X may be configured by the network operator or may be predetermined by the system. Drops are more straightforward to measure, however latency is more sensitive to link bandwidth estimations as it is possible to monitor the changes in link capacity before packets are dropped.

The system may then determine dynamic link bandwidth estimation in closed loop operation with AIMD extension. For example, to avoid too much oscillation, the method may be adapted. At T0: Set shaper to initial link speed value (MAX of theoretical max or outcome of the Initialization phase). At T1: If shaper speed was met since T0, increase shaper by 0.5% 1%, 2% or the like. If shaper speed was not met, decrease shaper by 5%, 10% or the like. It would be understood that the time between T1-T0 could be as low as 5 seconds, 10 seconds, 20 seconds or the like but may also be fairly large, for example 1 hour, 2 hours or the like.

In another example, the system may use binary-search extension. A specific example is presented below but it will be understood that the percentage increase or decrease may be predetermined or may be configured by the operator.

T0: Set shaper based on an initial link bandwidth value, for example (MAX of theoretical max or as determined by the initialization period of the system.)

T1: If shaper speed was met since T0, increase shaper by 1%

If shaper speed was not met, decrease shaper by 5%

T2: If shaper speed was met since T0, increase shaper by 2%

If shaper speed was met only since T1, increase shaper speed by 0.5%

If shaper speed was not met since T0, decrease shaper by 10%

If shaper speed was not met only since T1, decrease shaper by 2.5%

The objective of this method is to try to hone in with ever smaller changes as the method nears or "gets close" to an optimized value and ever larger changes when the method appears to be far off the target value. This solution may result in an under-estimate link bandwidth when there is low demand, which may not affect performance as there is more bandwidth than needed. As the bandwidth use increases, the shaper speed will be met. Thus, T1 will be invoked where the shaper is increased by 1%. If the shaper speed is met in the next time interval even after increasing the bandwidth value by 1%, then again T1 is invoked. This process is iterative, and helps the shaper speed be continuously updated based on demand.

In some cases, the method and system may risk an over-estimation of bandwidth for the fixed wireless access link. There might be iterations where the system and method may over estimate because the system took a step up, which is undesirable. In some cases, the monitoring module is configured to measure whether the "shaper met" criteria such that the system may only increase the shaper when there is some indication that there really is more bandwidth. That may be decided by measuring the buffer/queue depth for all the flows. The average buffer/queue depth over all the flows must be more than a certain value for the "shaper met" criteria to be met.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for link bandwidth management in a computer network, the method comprising:
    monitoring link traffic flow for a predetermined amount of time;
    measuring throughput of the link traffic flow, wherein measuring the throughput comprises:
        disabling at least one shaper for a predetermined period at predetermined intervals;
        determining a highest throughput point at each predetermined interval; and
    estimating the bandwidth available on the link based on the highest throughput points; and
    calibrating at least one shaper based on the estimated bandwidth.

2. The method according to claim 1, further comprising:
    monitoring the link traffic flow after calibration;
    determining whether the calibration of the bandwidth is affecting traffic flow; and
    re-calibrating the at least one shaper based on the effect to the traffic flow.

3. The method of claim 1, wherein the predetermined period is minutes and the predetermined intervals are hours.

4. The method of claim 1 wherein the estimating the bandwidth based on the highest throughput points comprises taking a rolling average based on a predetermined number of previous highest throughput points.

5. The method of claim 1 wherein the estimating the bandwidth based on the highest throughput points comprises a weighted average favoring the more recent highest throughput points.

6. The method of claim 2, wherein determining whether the calibration of the bandwidth is affecting the traffic flow comprises:
    determining whether packet loss has changed after the calibration of the traffic flow.

7. The method of claim 2, wherein determining whether the calibration of the bandwidth is affecting the traffic flow comprises:
    determining whether round trip time has changed after the calibration of the traffic flow.

8. The method of claim 2, wherein re-calibrating the at least one shaper comprises:
    iteratively amending the shaper by increasing or decreasing allocation based on a number of packet drops.

9. The method of claim 1, wherein the bandwidth of the link traffic flow is affected by atmospheric factors.

10. A system for link bandwidth management in a computer network, the system comprising at least one processor configured to execute instructions stored in a memory component wherein the instructions provide for modules comprising:
  a learning module configured to monitor link traffic flow for a predetermined amount of time;
  an analysis module configured to measuring throughput of the link traffic flow and estimate the bandwidth available on the link, based on the throughput, wherein measuring the throughput comprises:
    disabling at least one shaper for a predetermined period at predetermined intervals;
    determining a highest throughput point at each predetermined interval; and
    estimating the bandwidth based on the highest throughput points; and
  a calibration module configured to calibrate at least one shaper based on the estimated bandwidth.

11. The system according to claim 10, further comprising:
  a monitoring module configured to monitor the link traffic flow after calibration and determine whether the calibration of the bandwidth is affecting traffic flow; and
  wherein the calibration module is further configured to re-calibrate the at least one shaper based on the effect to the traffic flow.

12. The system of claim 10, wherein the predetermined period is minutes and the predetermined intervals are hours.

13. The system of claim 10 wherein the estimating the bandwidth based on the highest throughput points comprises a rolling averaged based on a predetermined number of previous highest throughput points.

14. The system of claim 10 wherein the estimating the bandwidth based on the highest throughput points comprises a weighted average favoring the more recent highest throughput points.

15. The system of claim 11, wherein the monitoring module is further configured to determine whether packet loss has changed after the calibration of the traffic flow.

16. The system of claim 11, wherein the monitoring module is further configured to determine whether round trip time has changed after the calibration of the traffic flow.

17. The system of claim 11, wherein when re-calibrating the at least one shaper, the calibration module is configured to:
  iteratively amend the shaper by increasing or decreasing allocations based on a number of packet drops.

18. The system of claim 10, wherein the bandwidth of the link traffic flow is affected by atmospheric factors.

* * * * *